US007580887B1

(12) United States Patent
Geering

(10) Patent No.: US 7,580,887 B1
(45) Date of Patent: Aug. 25, 2009

(54) METHOD AND APPARATUS FOR FACILITATING PURCHASE TRANSACTIONS ACROSS A NETWORK

(75) Inventor: John E. Geering, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/560,660

(22) Filed: Apr. 27, 2000

(51) Int. Cl.
G06Q 40/00 (2006.01)
G06Q 30/00 (2006.01)
G06K 5/00 (2006.01)

(52) U.S. Cl. .............................. 705/40; 705/26; 705/39; 235/380

(58) Field of Classification Search .................. 705/34, 705/40, 35, 26, 39, 27, 44, 1, 5; 235/380
See application file for complete search history.

(56) References Cited

U.S. PATENT DOCUMENTS

| 5,283,829 | A | * | 2/1994 | Anderson | 705/40 |
|---|---|---|---|---|---|
| 5,692,132 | A | * | 11/1997 | Hogan | 705/27 |
| 5,699,528 | A | * | 12/1997 | Hogan | 705/40 |
| 5,956,698 | A | * | 9/1999 | Lacheze et al. | 705/34 |
| 5,963,925 | A | * | 10/1999 | Kolling et al. | 705/40 |
| 5,991,749 | A | * | 11/1999 | Morrill, Jr. | 705/44 |
| 6,968,174 | B1 | * | 11/2005 | Trandal et al. | 379/114.01 |
| 7,007,000 | B2 | * | 2/2006 | Engelhart | 705/44 |
| 7,028,891 | B2 | * | 4/2006 | O'Neal | 235/380 |
| 7,043,447 | B2 | * | 5/2006 | Hughes et al. | 705/26 |
| 7,330,884 | B1 | * | 2/2008 | Eubanks | 709/224 |
| 7,464,880 | B2 | * | 12/2008 | Silverbrook et al. | 235/380 |

OTHER PUBLICATIONS

Anonymous "EFT Issues: U.S. EFT Prepares For A British Technology Invasion" Sep. 25 1994, Bank Network News.*
Crawford, Alan "Interactive: US warns of need to build on-line trust" Jun. 17, 1998, Scotsman, p. 3.*
Anonymous "Vantive Adds 3Com Executive Tom Thomas to Board of Directors; 3Com CIO Brings Extensive Networking Experience to Vantive" Oct. 6, 1998, Business Wire.*
Anonymous "Clicking for Cards with Citi (Citigroup introduced an Internet-only credit card, ClickCredit, allowing consumers to keep Internet purchases on a separate card)" Nov. 1999, Credit Card Management, V12N8, p. 11+.*
Hackett, John "e Banking BEA: Motorola Offers Cell Phone For Credit Cards.(Company Business and Marketing)" Apr. 2000, Bank Technology News, V14N4.*

* cited by examiner

Primary Examiner—Kelly Campen
(74) Attorney, Agent, or Firm—Dorsey & Whitney LLP

(57) ABSTRACT

A local computer system that provides and records information to facilitate a purchase transaction across a network operates by first receiving a request for billing information relating to a purchase transaction from a remote computer system. The local system then retrieves the billing information from its local store, and sends the billing information to the remote system. After the remote system completes the purchase transaction, the local system receives a confirmation from the remote system. The local system then records this confirmation in its local store which enables a user of the local system to subsequently look up the confirmation information based on a purchase transaction identifier. Before the local system retrieves and sends the billing information, a user of the local system is asked to confirm if the billing information can be released to the remote system.

15 Claims, 2 Drawing Sheets

METHOD AND APPARATUS FOR FACILITATING PURCHASE TRANSACTIONS ACROSS A NETWORK

BACKGROUND

1. Field of the Invention

The present invention relates to electronic commerce. More specifically, the present invention relates to a method and an apparatus for providing information and recording information in order to facilitate a purchase transaction conducted across a network.

2. Related Art

The recent success of the electronic commerce over the Internet can largely be attributed to the ease with which consumers can make purchase transactions from the comfort and privacy of their homes at any hour of the day or night.

One of the problems in making such purchase transactions is that a consumer is required to input billing information, such as credit card information and a shipping address, in order to consummate the purchase transaction. The requirement to continually resubmit such information for each purchase transaction is an annoyance that can make the process of purchasing items across the Internet less attractive to a consumer.

In order to remedy this problem, some web sites store billing information for consumers that visit their web sites, so that the consumer does not have to re-enter the same billing information for subsequent purchase transactions on the web sites. Unfortunately, since the billing information is kept separately on each web site, the consumer must still re-enter the billing information in order to purchase items from new web sites.

What is needed is a method and an apparatus that provides billing information to a remote computer system in order to facilitate a purchase transaction from the remote computer system.

After a purchase transaction is complete, web sites often communicate confirmation information, such as a confirmation number, details of the purchase transaction and shipping information, to the consumer. This is typically accomplished by displaying the confirmation information on the consumer's browser. Unfortunately, in order to remember this confirmation information, the consumer typically scribbles the confirmation information on a scrap of paper, which can be easily lost. Confirmation information can additionally be sent to a consumer in an email message. However, this email message must be saved and cross-referenced with the purchase transaction, which involves extra work that can be annoying to the consumer.

Additionally, what is needed is a method and an apparatus that automatically receives and stores confirmation information related to the purchase transaction so that the confirmation information to be easily retrieved by the consumer.

SUMMARY

One embodiment of the present invention relates to a system that provides information and records information to facilitate a purchase transaction across a network. The system operates by receiving a request for billing information relating to a purchase transaction from a remote computer system. In response to the request, the system retrieves the billing information from a local store in the local computer system, and sends the billing information to the remote computer system. After the remote computer system completes the purchase transaction, the system receives confirmation information for the purchase transaction from the remote computer system. The system records this confirmation information in the local store in the local computer system. This enables a user of the local computer system to subsequently look up the confirmation information based on a purchase transaction identifier.

In one embodiment of the present invention, retrieving the billing information involves asking the user of the local computer system if the billing information can be released to the remote computer system. If the user confirms that the billing information can be released to the remote computer system, the local computer system sends the billing information to the remote computer system. In a variation on this embodiment, the system additionally asks the user of the local computer system for a password for the billing information, and uses this password to access the billing information from the local store.

In one embodiment of the present invention, the billing information includes credit card information for the purchase transaction, a billing address for the purchase transaction, and a shipping address for the purchase transaction.

In one embodiment of the present invention, the confirmation information includes a confirmation number for the purchase transaction, a list of the items involved in the purchase transaction, a total amount for the purchase transaction, a seller's name for the purchase transaction, a date of the purchase transaction, and shipping information related to the purchase transaction.

In one embodiment of the present invention, prior to receiving the request for the billing information, the system asks the user of the local computer system for the billing information, and records the billing information in the local store in the local computer system.

In one embodiment of the present invention, prior to receiving the request for the billing information, the system receives a request from the user of the local computer system to purchase at least one item from the remote computer system, and forwards the request to the remote computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
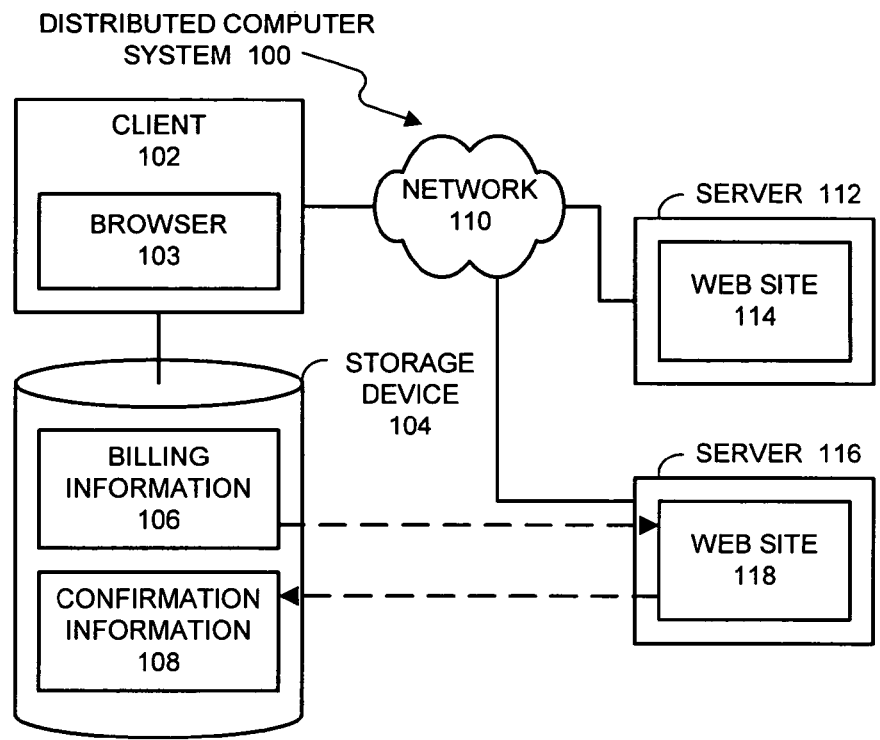
FIG. 1 illustrates a distributed computer system in accordance with an embodiment of the present invention.

FIG. 1 illustrates a distributed computer system 100 in accordance with an embodiment of the present invention. Distributed computer system 100 includes client 102 coupled to servers 112 and 116 through network 110.

Network 110 can include any type of wire or wireless communication channel capable of coupling together computing nodes. This includes, but is not limited to, a local area network, a wide area network, or a combination of networks. In one embodiment of the present invention, network 110 includes the Internet.

Client 102 can include any node on network 110 including computational capability and including a mechanism for communicating across network 110. In the embodiment of the present invention illustrated in FIG. 1, client 102 includes browser 103. Browser 103 can include any type of web browser capable of viewing a web site, such as the INTERNET EXPLORER™ browser distributed by the Microsoft Corporation of Redmond, Wash.

Client 102 is also coupled to storage device 104. Storage device 104 can include any type of non-volatile storage device that can be coupled to client 102. This includes, but is not limited to, magnetic, optical, and magneto-optical storage devices, as well as storage devices based on semiconductor flash memory and/or battery-backed up semiconductor memory. Storage device 104 contains billing information 106 and confirmation information 108 which are described in more detail below with reference to FIG. 2 and FIG. 3.

Servers 112 and 116 can include any nodes on network 110 including a mechanism for servicing requests from client 102 for computational and/or data storage resources.

Servers 112 and 116 contain web sites 114 and 118, respectively. Web sites 114 and 118 each contain a collection of inter-linked web pages that can be navigated through by a user of browser 103 in order to view textual and/or graphical data. More specifically, web sites 114 and 118 present textual and graphical data to enable a user of browser 103 to purchase items from web sites 114 and 118.

The system illustrated in FIG. 1 operates generally as follows. A user of browser 103 navigates through web site 118 on server 116. During the course of this navigation, the user makes a request to purchase one or more items from web site 118. In order to process the purchase transaction, web site 118 requests billing information 106 from the user of browser 103. This billing information is retrieved from storage device 104 and is sent to web site 118. Web site 118 completes the purchase operation and sends confirmation information 108 to client 102. This confirmation information is stored in storage device 104.

Billing Information

Figure 2:
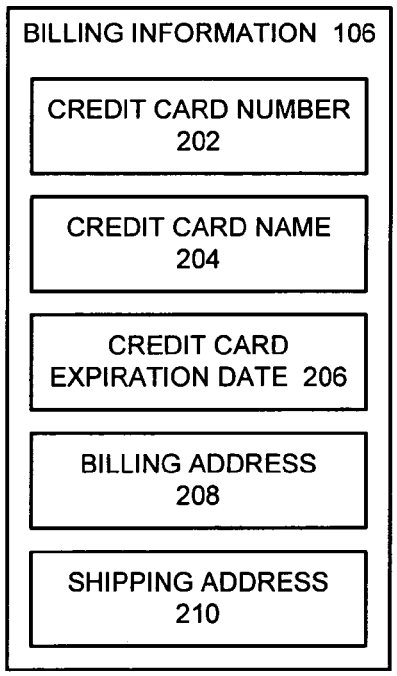
FIG. 2 illustrates a record containing billing information in accordance with an embodiment of the present invention.

FIG. 2 illustrates a record containing billing information 106 in accordance with an embodiment of the present invention. Billing information 106 includes credit card information, including credit card number 202, credit card name 204 and credit card expiration date 206. Note that any other type of payment instrument can be used instead of a credit card. For example, the billing information 106 can identify a debit card or digital cash. Billing information 106 can also include billing address 208 (and optionally shipping address 210 if the shipping address 210 is different from the billing address 208). Note that any other type of information that can be utilized by web site 118 to facilitate the purchase transaction can be included in billing information 106.

Confirmation Information

Figure 3:
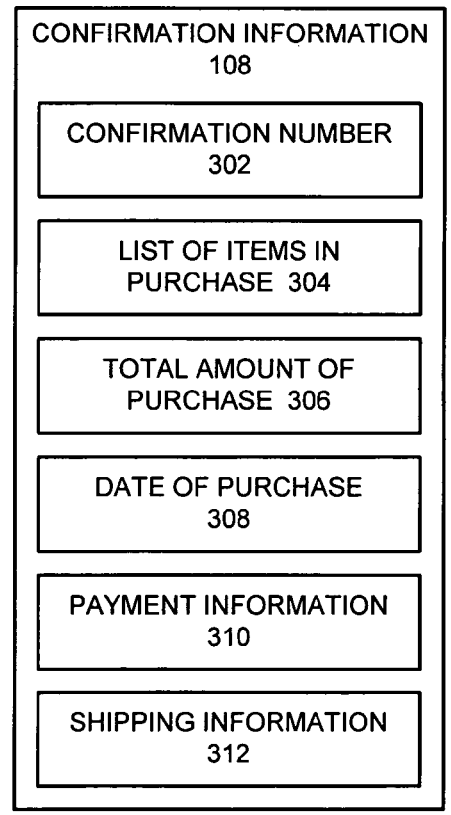
FIG. 3 illustrates a record containing confirmation information in accordance with an embodiment of the present invention.

FIG. 3 illustrates a record containing confirmation information 108 in accordance with an embodiment of the present invention. In general, confirmation information 108 can include any type of information related to the purchase transaction that can be useful to a purchaser. For example, in the embodiment illustrated in FIG. 3, confirmation information 108 includes confirmation number 302, which can be used to reference the purchase transaction. Confirmation information 108 also includes details of the purchase transaction, including a list of the items purchased 304, and a total amount 306 (in a currency of choice) for the purchase transaction.

Confirmation information 108 also includes the date and time of the purchase transaction 308, as well as payment information 310 for the transaction. This payment information can include the credit card information from billing information 106, as well as any type of transaction identifiers or other information provided by the credit card company.

Confirmation information 108 also includes shipping information 312 which may specify the shipping company, the date the item was shipped, a scheduled delivery time, shipping costs, and a tracking number for the item.

Providing Billing Information and Recording Confirmation Information

Figure 4:
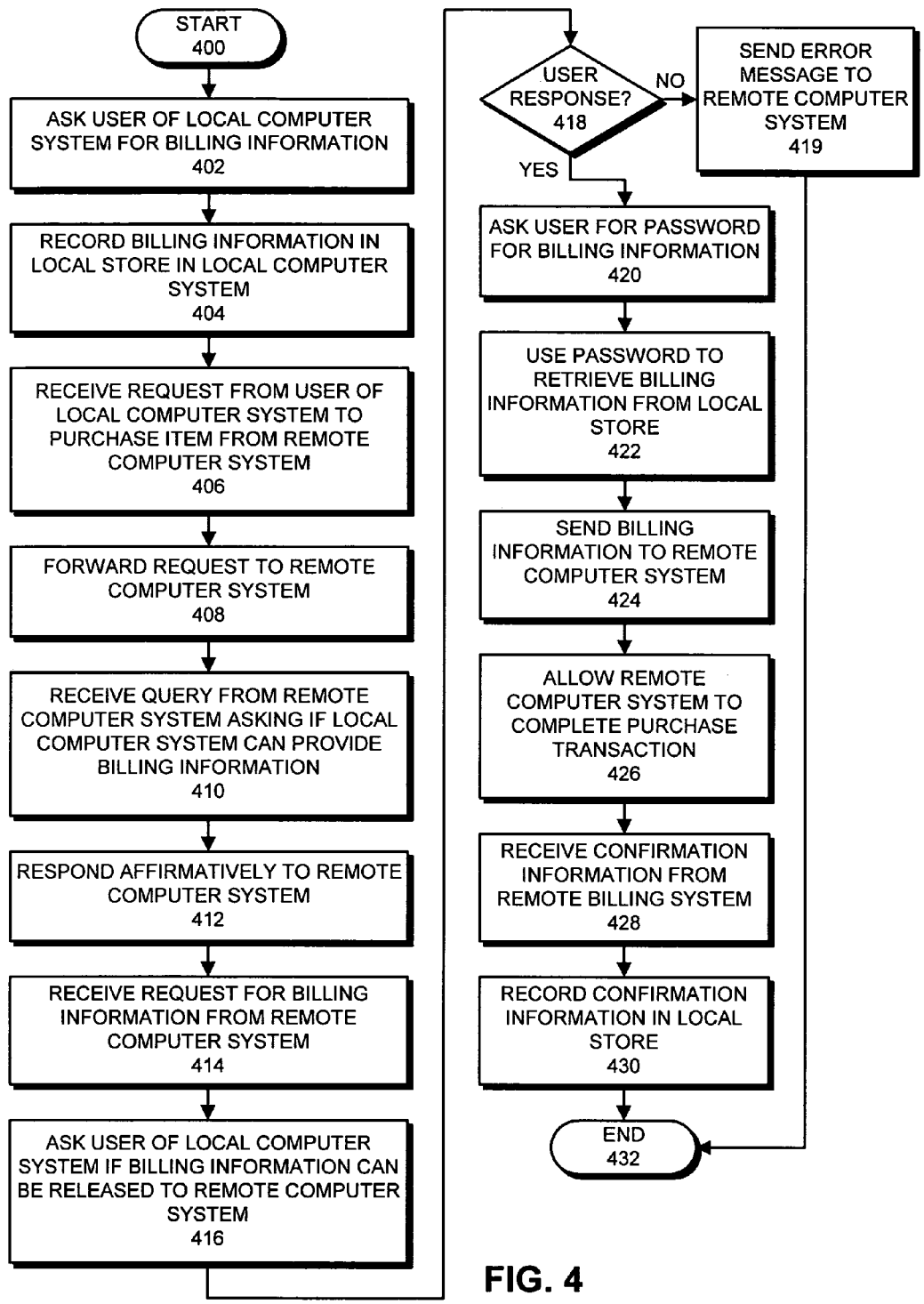
FIG. 4 is a flow chart illustrating the process of automatically providing billing information and automatically recording confirmation information in accordance with an embodiment of the present invention.

FIG. 4 is a flow chart illustrating the process of automatically providing billing information and automatically recording confirmation information in accordance with an embodiment of the present invention.

The system starts by asking a user of a local computer system (client 102) for billing information (step 402). When the user provides the billing information, client 102 records it in storage device 104 (step 404). (Note that this process can take place during a preceding purchase transaction in which the user enters the billing information.)

While the user of client 102 is scanning through a web site, such as web site 118 on server 116, client 102 receives a request from the user to purchase an item from the remote computer system (server 116) (step 406). Browser 103 forwards the request to server 116 (step 408).

Next, client 102 receives a query from server 116 asking if client 102 is able to provide billing information 106 automatically (step 410). Client 102 responds affirmatively to this query (step 412).

Next, client 102 receives a request for billing information 106 from server 116 (step 414). In response to this request, client 102 asks the user of client 102 if billing information 106 can be released to server 116 (step 416). If the user says no, the system sends an error message to server 116 (step 419) and terminates the process.

If the user responds that the billing information 106 can be released, the system asks the user of client 102 for a password (or some other form of authentication) in order to access billing information 106 (step 420). The system uses the password (or other form of authentication) to retrieve billing information 106 from storage device 104 (step 422). This may involve using the password to decrypt billing information 106. Note that the steps of asking if the local computer system can provide billing information, and asking for a password are optional safeguards that are not used in some embodiments of the present invention.

Next, billing information 106 is sent to server 116 (step 424). This enables server 116 to process the purchase transaction (step 426).

After the purchase transaction is complete, client 102 receives confirmation information 108 from server 116 (step 428). Client 102 records confirmation information 108 in storage device 104 in a form that enables confirmation information 108 to be retrieved using a purchase transaction identifier (step 430). For example, confirmation information 108 can be stored so that it can be indexed by various attributes of the purchase transaction, such as the items purchased, the seller of the items, the date of the purchase, the confirmation number or the amount of the purchase. In one embodiment of the present invention, when the user of client 102 subsequently asks to view confirmation information, the user is presented with confirmation information from recent purchase transactions involving various web sites on network 110. This enables the user to select the confirmation information for a particular purchase transaction.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method performed by a local client computer system having an electronic storage device for providing and recording information to facilitate a purchase transaction across a network, comprising:
   receiving a request for billing information at the local client computer system from a remote computer system, the billing information relating to a purchase transaction from the remote computer system, wherein the billing information includes at least one of:
      credit card information for the purchase transaction,
      a billing address for the purchase transaction, and
      a shipping address for the purchase transaction;
   electronically retrieving the billing information from the electronic storage device in the local client computer system;
   sending the retrieved billing information from the local client computer system to the remote computer system;
   allowing the remote computer system to complete the purchase transaction;
   receiving confirmation information for the purchase transaction from the remote computer system at the local client computer system; and
   electronically recording the confirmation information in the electronic storage device so that a user of the local client computer system can subsequently lookup the confirmation information based on a purchase transaction identifier.

2. The method of claim 1, wherein retrieving the billing information includes:
   asking the user of the local client computer system if the billing information can be released to the remote computer system; and
   using the local client computer system to send the billing information from the local client computer system to the remote computer system only if the user confirms that the billing information can be released to the remote computer system.

3. The method of claim 2, further comprising:
   asking the user of the local client computer system for a password for the billing information; and
   using the password to access the billing information from the electronic storage device.

4. The method of claim 1, wherein the confirmation information includes at least one of:
   a confirmation number for the purchase transaction;
   a list of items involved in the purchase transaction;
   a total amount for the purchase transaction;
   a seller's name for the purchase transaction;
   a date of the purchase transaction; and
   shipping information related to the purchase transaction.

5. The method of claim 1, further comprising, prior to receiving the request for the billing information,
   asking the user of the local client computer system for the billing information; and
   recording the billing information in the electronic storage device in the local client computer system.

6. A computer-readable storage medium storing instructions that when executed by a computer cause the computer to perform a method for providing and recording information to facilitate a purchase transaction across a network, the method comprising:
   receiving a request for billing information at the local client computer system from a remote computer system, the billing information relating to a purchase transaction from the remote computer system, wherein the billing information includes at least one of:
      credit card information for the purchase transaction,
      a billing address for the purchase transaction, and
      a shipping address for the purchase transaction;
   electronically retrieving the billing information from the electronic storage device in a the local client computer system;
   sending the retrieved billing information from the local client computer system to the remote computer system;
   allowing the remote computer system to complete the purchase transaction;
   receiving confirmation information for the purchase transaction from the remote computer system at the local client computer system; and
   electronically recording the confirmation information in the electronic storage device so that a user of the local client computer system can subsequently lookup the confirmation information based on a purchase transaction identifier.

7. The computer-readable storage medium of claim 6, wherein retrieving the billing information includes:
   asking the user of the local client computer system if the billing information can be released to the remote computer system; and
   using the local client computer system to send sending the billing information from the local client computer system to the remote computer system only if the user confirms that the billing information can be released to the remote computer system.

8. The computer-readable storage medium of claim 7, wherein the method further comprises:
   asking the user of the local client computer system for a password for the billing information; and
   using the password to access the billing information from the electronic storage device.

9. The computer-readable storage medium of claim 6, wherein the confirmation information includes at least one of:
   a confirmation number for the purchase transaction;
   a list of items involved in the purchase transaction;

a total amount for the purchase transaction;
a seller's name for the purchase transaction;
a date of the purchase transaction; and
shipping information related to the purchase transaction.

10. The computer-readable storage medium of claim 6, wherein the method further comprises, prior to receiving the request for the billing information:
   asking the user of the local client computer system for the billing information; and
   recording the billing information in the electronic storage device in the local client computer system.

11. An apparatus that provides and records information to facilitate a purchase transaction across a network, comprising:
   a receiving mechanism that is configured to receive a request for billing information from a remote computer system, the billing information relating to a purchase transaction from the remote computer system, wherein the billing information includes at least one of:
      credit card information for the purchase transaction,
      a billing address for the purchase transaction, and
      a shipping address for the purchase transaction;
   a retrieving mechanism that is configured to retrieve the billing information from an electronic storage device in a the local client computer system;
   a sending mechanism that is configured to send from the local client computer system the retrieved billing information to the remote computer system;
   wherein the receiving mechanism is additionally configured to receive confirmation information for the purchase transaction from the remote computer system at the local client computer system; and
   a recording mechanism that is configured to electronically record the confirmation information in the electronic storage device so that a user of the local client computer system can subsequently lookup the confirmation information based on a purchase transaction identifier.

12. The apparatus of claim 11, wherein the sending mechanism is configured to:
   ask the user of the local client computer system if the billing information can be released from the local client computer system to the remote computer system; and to
   send the billing information to the remote computer system only if the user confirms that the billing information can be released to the remote computer system.

13. The apparatus of claim 12, wherein the retrieving mechanism is configured to:
   ask the user of the local client computer system for a password for the billing information; and to
   use the password to access the billing information from the electronic storage device.

14. The apparatus of claim 11, wherein the confirmation information includes at least one of:
   a confirmation number for the purchase transaction;
   a list of items involved in the purchase transaction;
   a total amount for the purchase transaction;
   a seller's name for the purchase transaction;
   a date of the purchase transaction; and
   shipping information related to the purchase transaction.

15. The apparatus of claim 11, further comprising an initialization mechanism that is configured to:
   ask the user of the local client computer system for the billing information; and to
   record the billing information in the electronic storage device in the local client computer system.

* * * * *

UNITED STATES PATENT AND TRADEMARK OFFICE
CERTIFICATE OF CORRECTION

PATENT NO.        : 7,580,887 B1
APPLICATION NO.   : 09/560660
DATED             : August 25, 2009
INVENTOR(S)       : John E. Geering It is certified that error appears in the above-identified patent and that said Letters Patent is hereby corrected as shown below:

In column 6, line 34, in Claim 6, delete "a the" and insert -- the --, therefor.

In column 6, line 53, in Claim 7, after "send" delete "sending".

In column 7, line 25, in Claim 11, delete "a the" and insert -- the --, therefor.

Signed and Sealed this

Twenty-seventh Day of October, 2009

David J. Kappos
*Director of the United States Patent and Trademark Office*